US012650611B2

(12) United States Patent
Du et al.

(10) Patent No.: US 12,650,611 B2
(45) Date of Patent: Jun. 9, 2026

(54) WEARABLE DEVICE

(71) Applicants: Beijing BOE Technology Development Co., Ltd., Beijing (CN); BOE TECHNOLOGY GROUP CO., LTD., Beijing (CN)

(72) Inventors: Zhihong Du, Beijing (CN); Jindou Liu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 565 days.

(21) Appl. No.: 18/022,792

(22) PCT Filed: Jun. 29, 2022

(86) PCT No.: PCT/CN2022/102258
§ 371 (c)(1),
(2) Date: Feb. 23, 2023

(87) PCT Pub. No.: WO2024/000241
PCT Pub. Date: Jan. 4, 2024

(65) Prior Publication Data
US 2024/0272453 A1 Aug. 15, 2024

(51) Int. Cl.
*G02B 30/56* (2020.01)
*G02B 27/01* (2006.01)
*G02B 27/09* (2006.01)

(52) U.S. Cl.
CPC ......... *G02B 30/56* (2020.01); *G02B 27/0172* (2013.01); *G02B 27/0955* (2013.01); *G02B 27/0977* (2013.01); *G02B 27/0994* (2013.01)

(58) Field of Classification Search
CPC G02B 30/56; G02B 27/0172; G02B 27/0955; G02B 27/0977; G02B 27/0994; G02B 6/06; G02B 6/08
(Continued)

(56) References Cited

U.S. PATENT DOCUMENTS

| | | | |
|---|---|---|---|
| 3,985,424 A | 10/1976 | Steinacher | |
| 2010/0195055 A1* | 8/2010 | Maekawa | G02B 5/136 353/10 |

(Continued)

FOREIGN PATENT DOCUMENTS

| | | |
|---|---|---|
| CN | 1318983 A | 10/2001 |
| CN | 2500131 Y | 7/2002 |

(Continued)

*Primary Examiner* — Toan Ton
(74) *Attorney, Agent, or Firm* — HOUTTEMAN LAW LLC

(57) ABSTRACT

The present disclosure provides a wearable device with a rear view function, the wearable device including: a wearable main body having a front view area and a rear view area; an image guide assembly fixed on the wearable main body and crossing over the front view area and the rear view area, wherein the image guide assembly has at least one light inlet and a light outlet, the at least one light inlet is in the rear view area, and the image guide assembly is configured to transmit rear view light received by the at least one light inlet to the light outlet and emit the rear view light; and a floating imaging assembly fixed on the wearable main body, and configured to form a floating image of a rear view image in the front view area according to light emitted from the light outlet.

20 Claims, 11 Drawing Sheets

(58) Field of Classification Search
USPC .......................................... 353/110; 359/110
See application file for complete search history.

(56) References Cited

U.S. PATENT DOCUMENTS

| | | | | |
|---|---|---|---|---|
| 2011/0181949 A1* | 7/2011 | Hashikawa | .......... | H04N 13/346 |
| | | | | 359/463 |
| 2021/0208326 A1* | 7/2021 | Zhao | .................... | G02F 1/1335 |

FOREIGN PATENT DOCUMENTS

| | | | | | |
|---|---|---|---|---|---|
| CN | 2827047 | Y | 10/2006 | | |
| CN | 101043617 | A | 9/2007 | | |
| CN | 106360870 | A | 2/2017 | | |
| CN | 107397288 | A | 11/2017 | | |
| CN | 207544424 | U | 6/2018 | | |
| CN | 109380796 | B | 5/2021 | | |
| CN | 113325586 | A | 8/2021 | | |
| CN | 113539062 | A | 10/2021 | | |
| EP | 0007432 | A1 | 2/1980 | | |
| EP | 1177733 | A1 | 2/2002 | | |
| WO | WO-2014084034 | A1 * | 6/2014 | ......... | G02B 27/0101 |
| WO | WO-2017123259 | A1 * | 7/2017 | ............ | G02B 30/26 |

* cited by examiner

Q1

3a

Q2

Q3

Q4

Floating
Image

Light Emitting
Object

3a

301

301a

Q4

Floating Image

Light Emitting Object

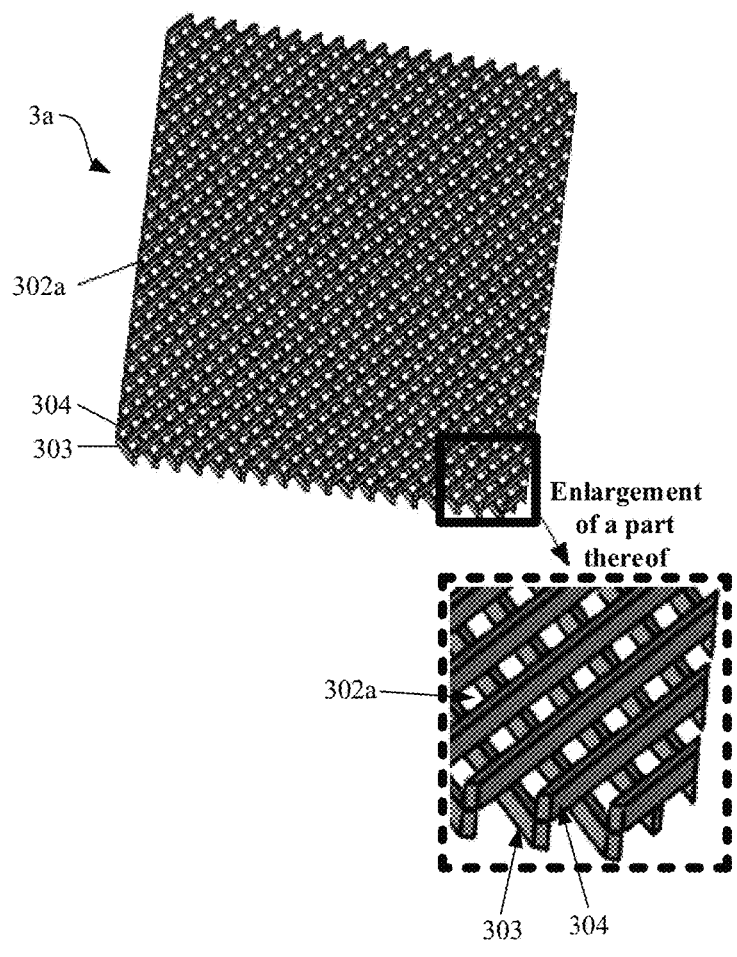
3a
302a
304
303
Enlargement
of a part
thereof
302a
303   304
FIG. 6
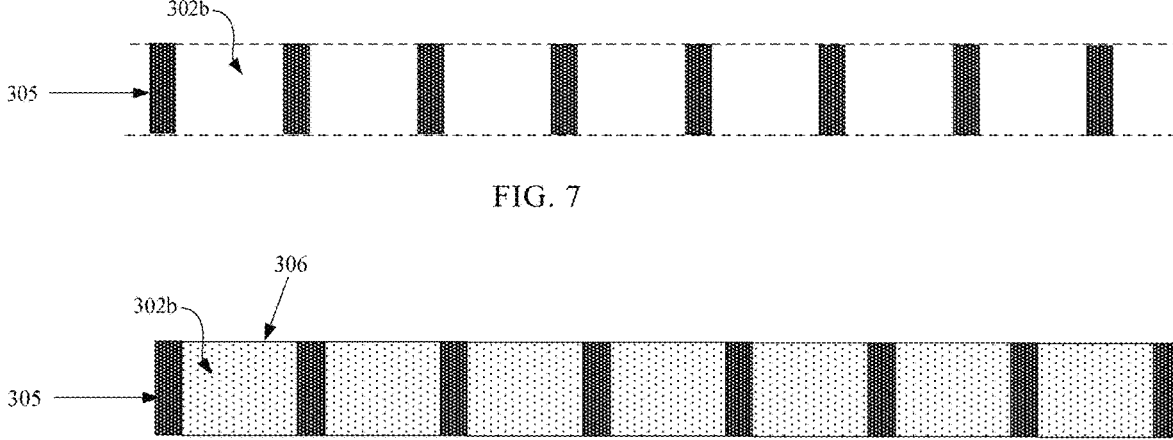
302b
305
FIG. 7
306
302b
305
FIG. 8

WEARABLE DEVICE

CROSS-REFERENCE TO RELATED APPLICATIONS

This is a National Phase Application filed under 35 U.S.C. 371 as a national stage of PCT/CN2022/102258 filed on Jun. 29, 2022, the entire content of which is incorporated herein by reference.

TECHNICAL FIELD

The present disclosure relates to the field of optical imaging technology, and in particular, to a wearable device with a rear view function.

BACKGROUND

In the process of travel, people have an increasing demand for a rear view function. So far, some wearable devices with a rear view function have been available on the market. The principle of realizing the rear view function is as follows: a rear view image is acquired firstly, and then projected onto a visor (i.e., an eyeshield) of the wearable device to present the rear view image on the visor.

Projecting the rear view image onto the visor has the following disadvantages: on one hand, the presentation of the rear view image depends on the visor, and when a user wears the wearable device but does not want to place the visor in front of his/her eyes, the user cannot see the rear view image; and on the other hand, a traditional visor is generally designed to have an irregular spherical surface, and the rear view image after being projected onto the visor may be distorted, such that the visual perception of the user is poor.

SUMMARY

Some embodiments of the present disclosure provide a wearable device.

Embodiments of the present disclosure provide a wearable device with a rear view function, the wearable device including:

a wearable main body having a front view area and a rear view area;

an image guide assembly fixed on the wearable main body and crossing over the front view area and the rear view area, wherein the image guide assembly has at least one light inlet and a light outlet, the at least one light inlet is in the rear view area, and the image guide assembly is configured to transmit rear view light received by the at least one light inlet to the light outlet and emit the rear view light; and a floating imaging assembly fixed on the wearable main body, and configured to form a floating image of a rear view image in the front view area according to light emitted from the light outlet.

In some embodiments, the floating imaging assembly includes a reflective array board, the reflective array board includes a plurality of light reflective channels arranged in an array along a first direction and a second direction, the first direction intersects with the second direction, and an inner sidewall of each of the plurality of light reflective channels is configured to have a light reflectivity.

In some embodiments, a cross-section of each of the plurality of light reflective channels in a plane parallel to a plane defined by the first direction and the second direction has a shape of a square or a rhombus.

In some embodiments, the reflective array board includes a reflective layer having therein a plurality of light transmitting holes which arranged in the array along the first direction and the second direction, a sidewall of each of the plurality of light transmitting holes has the light reflectivity, and the plurality of light transmitting holes serve as the light reflective channels.

In some embodiments, the reflective array board includes two reflective layers stacked together, and the two reflective layers include a first reflective layer and a second reflective layer;

the first reflective layer includes a plurality of first reflective strips, which are arranged to be spaced apart from each other along the first direction, and extend along the second direction;

the second reflective layer includes a plurality of second reflective strips, which are arranged to be spaced apart from each other along the second direction, and extend along the first direction; and the first direction intersects with the second direction, the plurality of first reflective strips cross over the plurality of second reflective strips to define a plurality of light transmitting holes, a sidewall of each of the plurality of light transmitting holes has the light reflectivity, and the plurality of light transmitting holes serve as the light reflective channels.

In some embodiments, a material of the reflective layer is a metal material.

In some embodiments, the metal material includes at least one of aluminum, silver, and chromium.

In some embodiments, each of the plurality of light transmitting holes is filled with a first transparent filler.

In some embodiments, the first transparent filler includes at least one of silicon dioxide, polymethyl methacrylate, polystyrene, and polycarbonate.

In some embodiments, the reflective array board includes a first dielectric layer provided therein with a plurality of through holes which are arranged in the array along the first direction and the second direction, and a refractive index of a region surrounded by each of the plurality of through holes is less than a refractive index of the first dielectric layer; and the plurality of through holes serve as the plurality of light reflective channels.

In some embodiments, the refractive index of the first dielectric layer is greater than or equal to 1.5.

In some embodiments, a material of the first dielectric layer includes at least one of silver sulfide, arsenic glass, titanium dioxide, and cadmium iodide.

In some embodiments, each of the plurality of through holes is filled with a second transparent filler, and the second transparent filler includes at least one of silicon dioxide and a transparent resin.

In some embodiments, each of the plurality of light reflective channels has a hole diameter less than or equal to 0.8 mm.

In some embodiments, the hole diameter of each of the plurality of light reflective channels ranges from 0.4 mm to 0.6 mm.

In some embodiments, each of the plurality of light reflective channels has a thickness ranging from 0.5 mm to 1.5 mm in a third direction perpendicular to both the first direction and the second direction.

In some embodiments, the reflective array board has a first side and a second side opposite to each other in a third direction perpendicular to both the first direction and the second direction; and the first side of the reflective array board has a first protective layer thereon; and/or, the second side of the reflective array board has a second protective layer thereon.

In some embodiments, the image guide assembly includes at least one optical fiber image transmitting bundle, and an eyepiece assembly and an objective lens assembly are respectively arranged at both ends of each of the at least one optical fiber image transmitting bundle; and a light incident surface of the objective lens assembly serve as one of the at least one light inlet of the image guide assembly, and a light outgoing surface of the objective lens assembly serve as the light outlet of the image guide assembly.

In some embodiments, each of the at least one optical fiber image transmitting bundle includes a plurality of optical fiber filaments, and an arrangement of the plurality of optical fiber filaments at one end of each optical fiber image transmitting bundle is twisted by 180 degrees relative to an arrangement of the plurality of optical fiber filaments at the other end of the optical fiber image transmitting bundle.

In some embodiments, the at least one optical fiber image transmitting bundle includes two or more optical fiber image transmitting bundles.

In some embodiments, the optical fiber imaging bundles are in one-to-one correspondence with objective lens assemblies; and all of the optical fiber image transmitting bundles share a same eyepiece assembly.

In some embodiments, the image guide assembly further includes an integrating fixture; and one end of each optical fiber image transmitting bundle is connected to a corresponding objective lens assembly, and the other end of each optical fiber image transmitting bundle passes through the integrating fixture and is connected to the eyepiece assembly.

In some embodiments, each optical fiber image transmitting bundle has a first part between the corresponding objective lens assembly and the integrating fixture and a second part between the integrating fixture and the eyepiece assembly; and arrangements of the optical fiber filaments at both ends of the first part are twisted by 180 degrees relative to each other, and arrangements of the optical fiber filaments at both ends of the second part are identical to each other.

In some embodiments, each optical fiber image transmitting bundle has a first part between the corresponding objective lens assembly and the integrating fixture and a second part between the integrating fixture and the eyepiece assembly;

first protective hoses are provided on peripheries of first parts of the optical fiber image transmitting bundles and are in one-to-one correspondence with the first parts of the optical fiber image transmitting bundles; and a second protective hose is provided on peripheries of second parts of the optical fiber image transmitting bundles, and the second parts of all of the optical fiber image transmitting bundles correspond to the second protective hose.

In some embodiments, the first protective hoses are metal hoses; and/or, the second protective hose is a metal hose.

In some embodiments, an outer contour shape of a surface, which is proximal to the eyepiece assembly, of the reflective array board matches to an outer contour shape of an overall pattern formed by an arrangement of all the optical fiber filaments directly opposite to the eyepiece assembly.

In some embodiments, the outer contour shape of the surface, which is proximal to the eyepiece assembly, of the reflective array board includes one of a rectangle, a circle, and an ellipse.

In some embodiments, the outer contour shape of the overall pattern formed by the arrangement of all the optical fiber filaments directly opposite to the eyepiece assembly is a rectangle; and the outer contour shape of the surface, which is proximal to the eyepiece assembly, of the reflective array board is a rectangle.

In some embodiments, the optical fiber image transmitting bundles include two optical fiber image transmitting bundles, which are a first optical fiber image transmitting bundle and a second optical fiber image transmitting bundle, respectively;

an outer contour shape of an overall pattern formed by an arrangement of all the optical fiber filaments in the first optical fiber image transmitting bundle at an end, which is proximal to the eyepiece assembly, of the first optical fiber image transmitting bundle is a first rectangle;

an outer contour shape of an overall pattern formed by an arrangement of all the optical fiber filaments in the second optical fiber image transmitting bundle at an end, which is proximal to the eyepiece assembly, of the second optical fiber image transmitting bundle is a second rectangle;

an outer contour shape of an overall pattern formed by an arrangement of all the optical fiber filaments in the first and second optical fiber image transmitting bundles at an end, which is proximal to the eyepiece assembly, of each of the first and second optical fiber image transmitting bundles is a third rectangle formed by splicing the first rectangle and the second rectangle together; and the outer contour shape of the surface, which is proximal to the eyepiece assembly, of the reflective array board is a fourth rectangle.

In some embodiments, the light incident surface of the objective lens assembly is provided thereon with a transparent protective cover.

In some embodiments, transparent protective covers of different objective lens assemblies are of different colors.

In some embodiments, the objective lens assembly includes a first barrel having therein a first hollow structure and a second hollow structure connected to each other, the first hollow structure has a first lens assembly arranged therein, and the second hollow structure is configured to fix a corresponding optical fiber image transmitting bundle.

In some embodiments, the first lens assembly includes a light collecting lens, a first light collimating lens, and a first glued double-lens which are arranged in sequence in a direction toward the second hollow structure.

In some embodiments, the eyepiece assembly include a second barrel having therein a third hollow structure and a fourth hollow structure connected to each other, the third hollow structure has a second lens assembly therein, and the fourth hollow structure is configured to fix a corresponding optical fiber image transmitting bundle.

In some embodiments, the second lens assembly includes a second light collimating lens and a second glued double-lens which are arranged in sequence in a direction toward the fourth hollow structure.

In some embodiments, the wearable main body is provided thereon with an opening at a position corresponding to each of the at least one light inlet.

In some embodiments, the wearable device further includes a light shielding cover matching to the opening, wherein the light shielding cover is configured to be placed in the opening to shield light emitted toward the opening.

In some embodiments, an inner sidewall of the opening is provided with an internal thread, and an outer sidewall of the light shielding cover is provided with an external thread that matches to the internal thread of the opening.

In some embodiments, the wearable device further includes a position adjuster, wherein the floating imaging assembly is connected to the wearable main body through the position adjuster, and the position adjuster is configured to adjust a position of the floating imaging assembly.

In some embodiments, the wearable main body includes a helmet or a goggle.

BRIEF DESCRIPTION OF THE DRAWINGS

FIG. 6 is a schematic diagram showing another structure of a reflective array board according to an embodiment of the present disclosure;

FIG. 7 is a schematic diagram showing yet another structure of a reflective array board according to an embodiment of the present disclosure;

FIG. 8 is a schematic diagram showing still another structure of a reflective array board according to an embodiment of the present disclosure;

DETAILED DESCRIPTION OF EMBODIMENTS

Figure 1A:
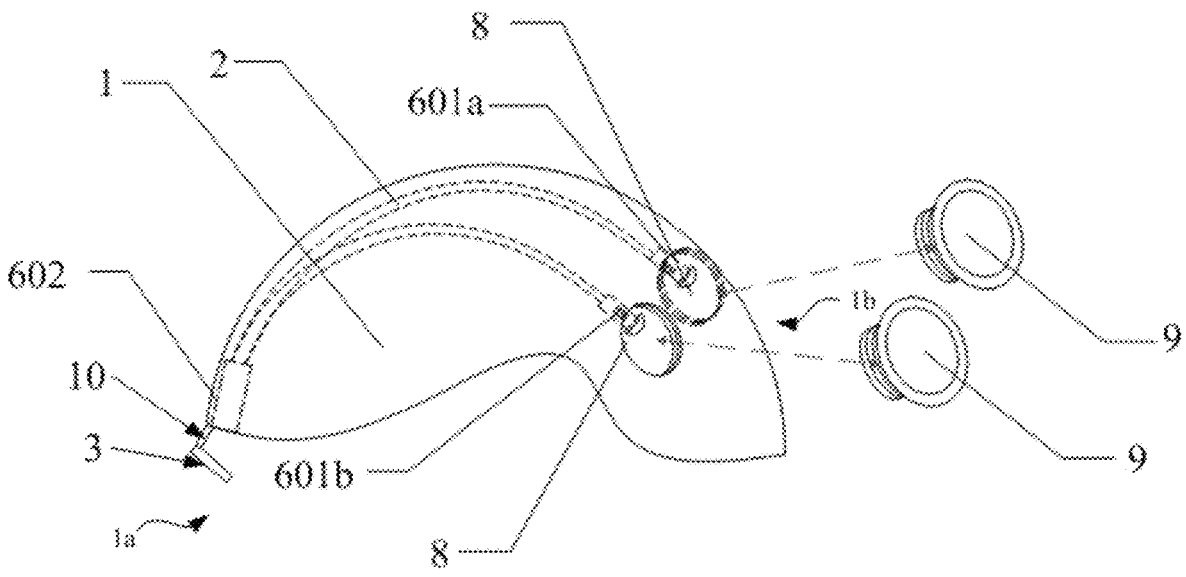
FIG. 1A is a schematic diagram showing a structure of a wearable device according to an embodiment of the present disclosure.

To help one of ordinary skill in the art better understand technical solutions of the present disclosure, the present disclosure will be further described in detail below with reference to the accompanying drawings and exemplary embodiments.

The present disclosure will be described in more detail below with reference to the accompanying drawings, throughout which like elements are denoted by like reference symbols. For clarity, various components shown in the drawings are not necessarily drawn to scale. Moreover, certain well-known components may not be shown in the drawings.

Numerous specific details of the present disclosure, such as structures, materials, dimensions (or sizes), processing techniques and technology of the components, are set forth in the following description in order to provide a more thorough understanding of the present disclosure. However, as will be understood by one of ordinary skill in the art, the present disclosure may be practiced without these specific details.

The expression of a range from A to B used in the present disclosure means that the defined range includes both the endpoints A and B.

Figure 1B:
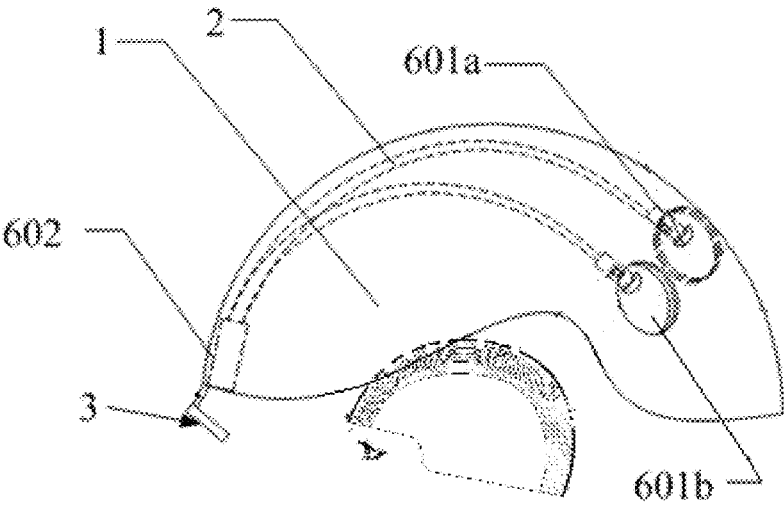
FIG. 1B is a schematic diagram of a user wearing a wearable device.
Figure 1C:
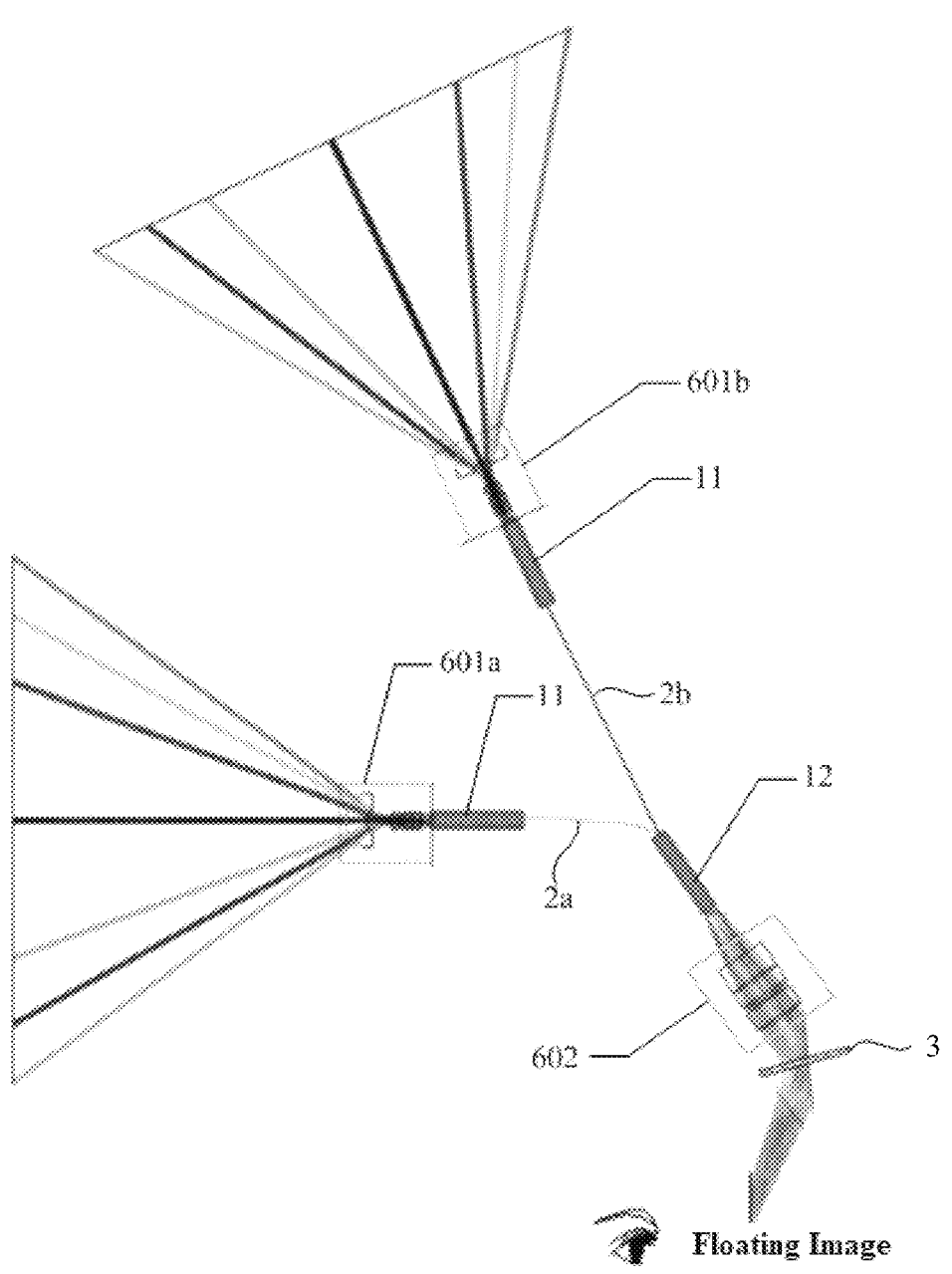
FIG. 1C is a schematic diagram showing the principle of implementing a rear view function according to an embodiment of the present disclosure.

FIG. 1A is a schematic diagram showing a structure of a wearable device according to an embodiment of the present disclosure. FIG. 1B is a schematic diagram of a user wearing the wearable device. FIG. 1C is a schematic diagram showing the principle of implementing a rear view function according to an embodiment of the present embodiment. As shown in FIG. 1A to FIG. 1C, the wearable device includes a wearable main body 1, an image guide assembly 2, and a floating imaging assembly 3.

The wearable main body 1 can be worn on the head of a user, and includes a front view area 1a and a rear view area 1b. The front view area 1a and the rear view area 1b are two opposite areas of the wearable main body 1. The front view area 1a is an area opposite to the eyes of a user after the user correctly wears the wearable main body 1, such that the eyes of the user can watch front scenes through the front view area 1a. The rear view area 1b is an area opposite to the back of the head of the user after the user correctly wears the wearable main body 1. The eyes of the user deviate from the rear view area 1b, and thus cannot watch rear scenes through the rear view area 1b.

In some embodiments, the wearable main body 1 is a helmet or a goggle. FIGS. 1A and 1B only illustrate a case where the wearable main body 1 is a helmet.

The image guide assembly 2 is connected to the wearable main body 1. The image guide assembly 2 includes at least one light inlet and a light outlet, and the at least one light inlet is located in the rear view area 1b. The image guide assembly 2 is configured to transmit rear view light received by the at least one light inlet to the light outlet and emit the rear view light.

The floating imaging assembly 3 is connected to the wearable main body 1 and/or the image guide assembly 2, and configured to form a floating image of a rear view image in the front view area 1a according to the light emitted from the light outlet.

In an embodiment of the present disclosure, the at least one light inlet of the image guide assembly 2 is disposed at a light inlet of the wearable main body 1 (i.e., the at least one light inlet of the image guide assembly 2 can receive a rear view image), the image guide assembly 2 transmits the rear view light received by the at least one light inlet to the light outlet (i.e., the rear view image is transmitted to the light outlet), and then the floating imaging assembly 3 forms the floating image of the rear view image in the front view area 1a (i.e., the rear view image is presented in the front view area 1a in the form of the floating image) by using the light emitted from the light outlet. In this way, after the wearable main body 1 is correctly worn by the user, the floating image of the rear view image can be observed through the front view area 1a by the eyes of the user.

In the present embodiment, the rear view image is presented in the form of the floating image without depending on a visor, such that even if a user does not place the visor in front of his/her eyes, the user can directly view the rear view image through the front view area, thereby improving the convenience of usage. In addition, since the rear view image is presented in the form of the floating image, the problem of distortion and deformation of the rear view image is avoided, thereby effectively improving the visual perception of the user.

Figure 2:
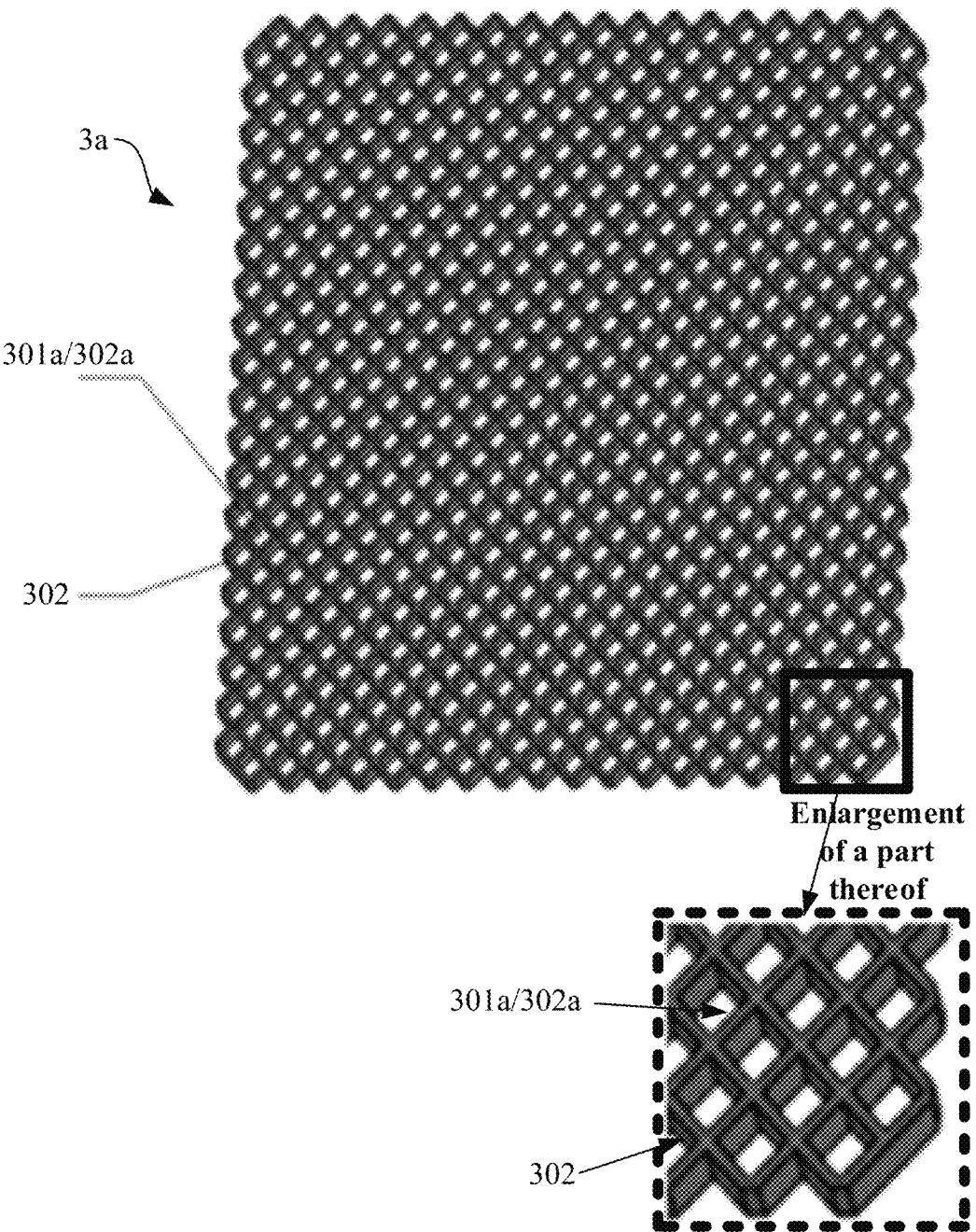
FIG. 2 is a schematic diagram showing a structure of a reflective array board according to an embodiment of the present disclosure.

FIG. 2 is a schematic diagram showing a structure of a reflective array board according to an embodiment of the present disclosure. As shown in FIG. 2, in some embodiments, the floating imaging assembly 3 includes a reflective array board 3a, and the reflective array board 3a includes a plurality of light reflective channels 301a which are arranged in an array along a first direction and a second direction, where the first direction intersects with the second direction, and an inner sidewall of each of the light reflective channels 301a is configured to have a light reflectivity. In this case, the reflective array board 3a has a grid (or mesh) shape.

In some embodiments, a section of each of the light reflective channels 301a has a shape of a square or a rhombus in a plane parallel to the plane defined by the first direction and the second direction. Alternatively, the section of each of the light reflective channels 301a in the plane parallel to the plane defined by the first direction and the second direction may have a shape of approximately a square or approximately a rhombus (e.g., an angle of the shape is a rounded angle).

It should be noted that in an embodiment of the present disclosure, the inner sidewall of each of the light reflective channels 301a being configured to have a light reflectivity means that the light reflectivity of the inner sidewall of each of the light reflective channels 301a is greater than or equal to 30%.

Figure 3:
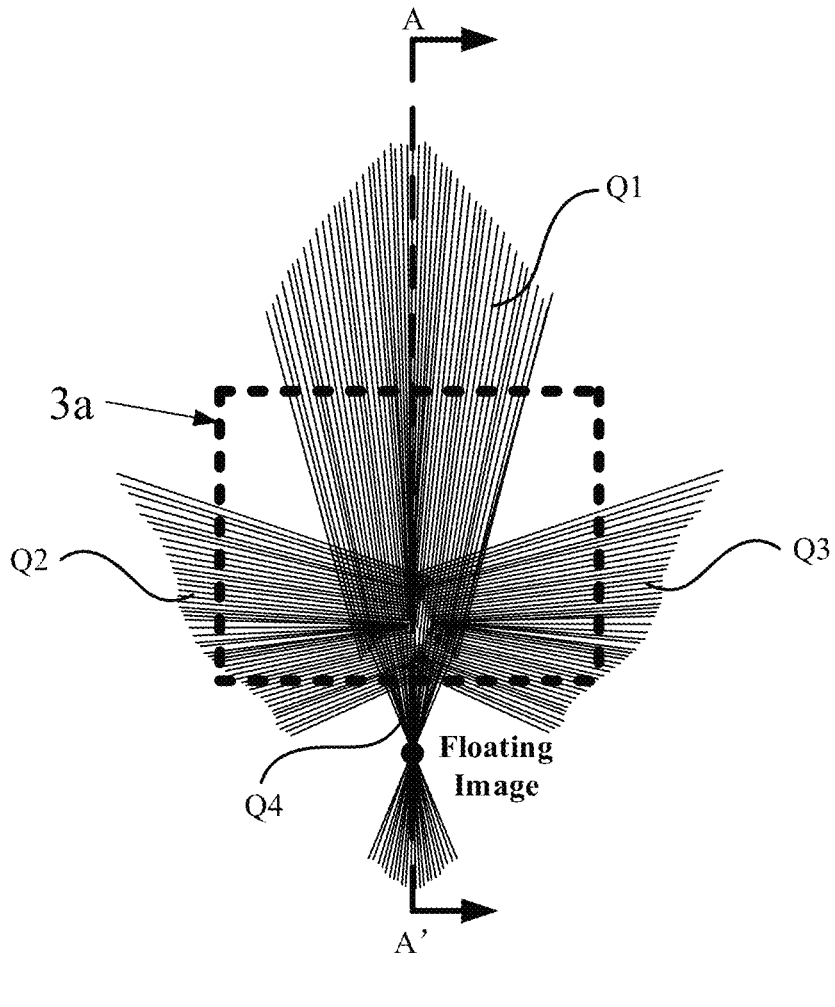
FIG. 3 is a schematic diagram of a light path of light emitted from a light emitting object and after hitting a reflective array board.
Figure 4:
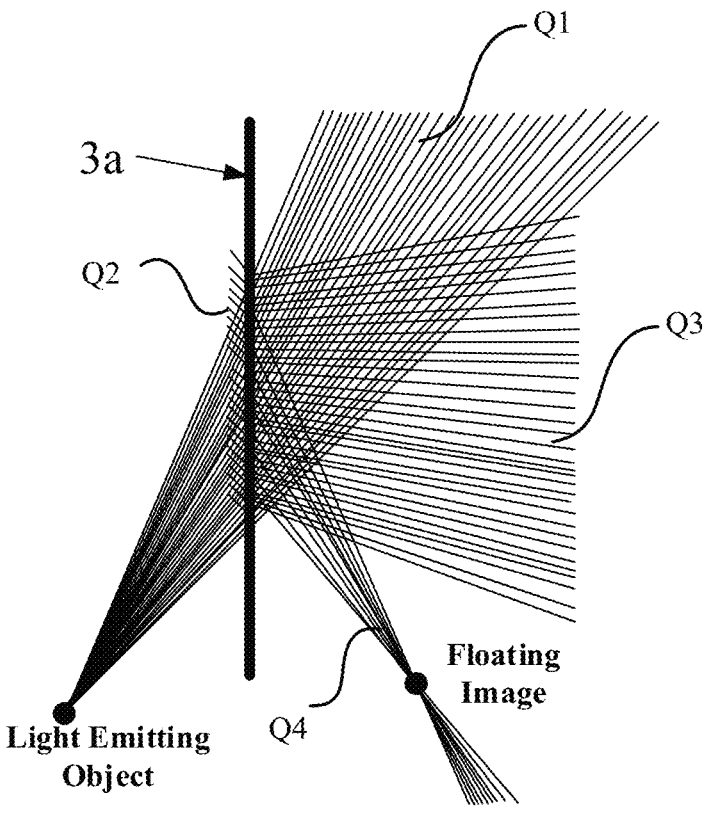
FIG. 4 is a schematic cross-sectional view taken along a direction A-A' as shown in FIG. 3.
Figure 5:
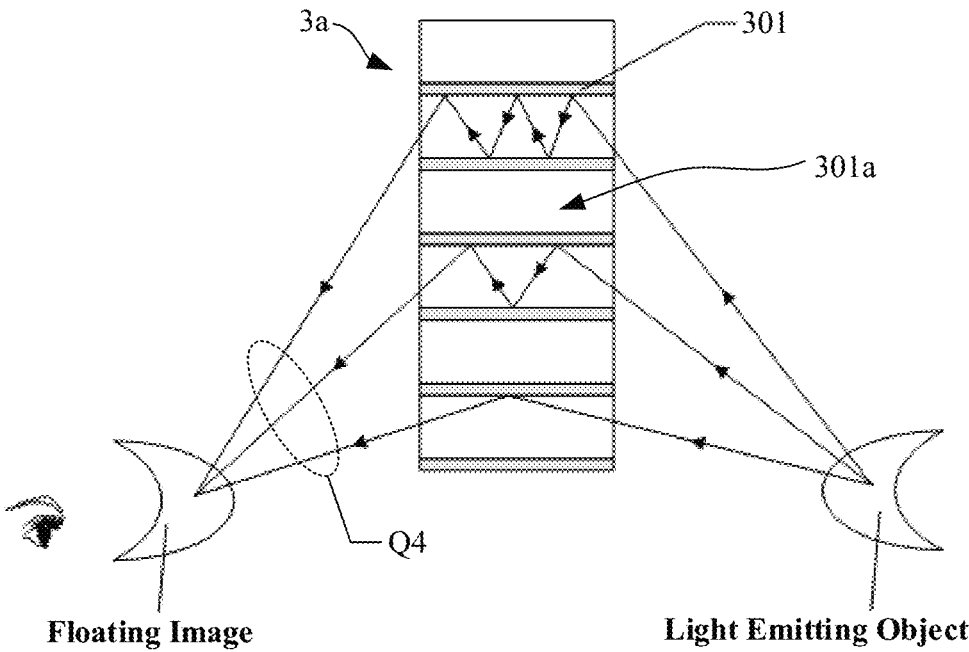
FIG. 5 is a schematic diagram showing a principle of achieving floating imaging by using a reflective array board according to an embodiment of the present disclosure.

FIG. 3 is a schematic diagram of a light path of light emitted from a light emitting object and after hitting the reflective array board, and FIG. 4 is a schematic cross-sectional view taken along a direction A-A' as shown in FIG. 3. FIG. 5 is a schematic diagram showing a principle of achieving floating imaging by using the reflective array board 3a according to an embodiment of the present disclosure. As shown in FIGS. 3 to 5, the light emitted in different directions from the light emitting object is reflected by different light reflective channels of the reflective array board 3a, and is divided into four parts of light which are a partial beam Q1, a partial beam Q2, a partial beam Q3, and a partial beam Q4. The partial beam Q1, the partial beam Q2 and the partial beam Q3 are each a divergent light beam, such that an image cannot be formed on a side of the reflective array board 3a distal to the light emitting object. The partial beam Q4 is a convergent light beam, such that a floating real image can be formed on the side of the reflective array board 3a distal to the light emitting object.

Referring to FIG. 5, FIG. 5 shows a path of light, which is capable of forming a floating image, emitted from only a certain object point on the light emitting object. Specifically, the light emitted at different angles from the certain object point on the light emitting object is reflected by the inner sidewalls 301 of different light reflective channels 301a, and the reflected light converges on the side of the reflective array board 3a distal to the light emitting object, thereby obtaining a floating image of the object point. Based on this principle, a complete floating image of the light emitting object can be obtained on the side of the reflective array board 3a distal to the light emitting object. The resultant floating image of the light emitting object and the light emitting object are mirror-symmetrical with each other about the reflective array board 3a.

With continuing reference to FIG. 2, in some embodiments, the reflective array board 3a includes a reflective layer 302 provided with a plurality of light transmitting holes 302a arranged in an array along the first direction and the second direction, and inner sidewalls of the light transmitting holes 302a each have the light reflectivity. The light transmitting holes 302a serve as the light reflective channels.

In some embodiments, the reflective layer 302 is made of a material of metal, and a surface of the metal has an efficient reflecting effect. The light transmitting holes are directly formed in the metal layer, and the inner sidewalls of the light transmitting holes 302a also each have the light reflectivity, such that the light transmitting holes 302a can directly serve as the light reflective channels 301a.

In some embodiments, the metal material may include at least one of aluminum, silver, and chromium.

FIG. 6 is a schematic diagram showing another structure of the reflective array board 3a according to an embodiment of the present disclosure. As shown in FIG. 6, unlike the previous embodiment in which the reflective array board 3a includes a single reflective layer, in the case shown in FIG. 6, the reflective array board 3a includes two reflective layers 303 and 304 which are stacked together, where the two reflective layers are a first reflective layer 303 and a second reflective layer 304, respectively. The first reflective layer 303 includes a plurality of first reflective strips, which are arranged to be spaced apart from each other along the first direction and extend along the second direction. The second reflective layer 304 includes a plurality of second reflective strips, which are arranged to be spaced apart from each other along the second direction and extend along the first direction. The first direction intersects with the second direction.

The plurality of first reflective strips cross over the plurality of second reflective strips to define the plurality of light transmitting holes 302a which are arranged in the array along the first direction and the second direction. The inner sidewalls of the light transmitting holes 302a have the light reflectivity, and the light transmitting holes 302a serve as the light reflective channels 301a.

In some embodiments, a material of the first reflective layer 303 and the second reflective layer 304 is a metal, and optionally, the metal material includes at least one of aluminum, silver, and chromium. The material of the first reflective layer 303 and the material of the second reflective layer 304 may be identical to each other or different from each other.

It should be noted that the material of the reflective layers according to an embodiment of the present disclosure is not limited to the metal material, but may be any material of which a surface has the light reflectivity.

In some embodiments, each of the light transmitting holes 302a is filled with a first transparent filler (not shown). By filling the first transparent filler in each of the light transmitting holes 302a, the reflective array board 3a having the grid shape can be effectively prevented from being deformed, thereby improving the stability of a structure of the reflective array board 3a. In some embodiments, the first transparent filler includes at least one of silicon dioxide, polymethyl methacrylate, polystyrene, and polycarbonate.

Alternatively, in an embodiment of the present disclosure, each of the light transmitting holes 302a may be filled with air instead of the first transparent filler, and in this case, the whole reflective array board 3a has a relatively small mass, which is beneficial to reducing the overall mass of the wearable device.

FIG. 7 is a schematic diagram showing yet another structure of a reflective array board according to an embodiment of the present disclosure. As shown in FIG. 7, in some embodiments, unlike the reflective array board 3a formed in the grid shape based on the light reflectivity of a surface of the metal in the foregoing embodiments, in the case shown in FIG. 7, a reflective array board 3a includes a first dielectric layer 305 in which a plurality of through holes 302b are formed in an array along a first direction and a second direction, and a refractive index of a region surrounded by each of the through holes 302b is less than a refractive index of the first dielectric layer, such that when light enters into each through hole 302b and reaches an inner sidewall of the through hole, at least part of the light is reflected (i.e., when an incident angle of the light is greater than a critical angle of totally internal reflection of the inner sidewall of the through hole, the light is totally reflected). In this case, the through holes 302b can serve as the light reflective channels 301a. In an embodiment of the present disclosure, light may be reflected by an interface between dielectrics having different refractive indexes.

In some embodiments, the refractive index of the first dielectric layer 305 is greater than or equal to 1.5. In some embodiments, the material of the first dielectric layer 305 includes at least one of silver sulfide, arsenic glass, titanium dioxide, and cadmium iodide.

In the case shown in FIG. 7, each of the through holes 302b has a hollow structure therein, and in this case, each of the through holes may be filled with air.

FIG. 8 is a schematic diagram showing still another structure of a reflective array board according to an embodiment of the present disclosure. As shown in FIG. 8, different from the case where the through holes in the first dielectric layer 305 are hollow structures as shown in FIG. 7, in the case shown in FIG. 8, each of the through holes 305 is filled with a second transparent filler 306, and a refractive index of the second transparent filler 306 is less than the refractive index of the first dielectric layer 305. In some embodiments, the second transparent filler 306 includes at least one of silicon dioxide and a transparent resin.

In an embodiment of the present disclosure, a hole diameter (i.e., a diameter of each hole) of each light reflective channel 301a in each of the reflective array boards 3a described above is less than or equal to 0.8 mm. In general, a smaller hole diameter of each light reflective channel 301a will result in that a clearer floating image is finally presented by the reflective array board 3a, but will make manufacturing of the reflective array board 3a be more difficult.

On balance of the imaging clarity and the manufacturing difficulty of the reflective array board 3a, in some embodiments, the hole diameter of each light reflective channel 301a ranges from 0.4 mm to 0.6 mm.

In some embodiments, a size (i.e., a dimension) of each light reflective channel 301a in a third direction ranges from 0.5 mm to 1.5 mm, and the third direction is perpendicular to both the first direction and the second direction. That is, a thickness of the entire reflective array board 3a ranges from 0.5 mm to 1.5 mm.

In some embodiments, the reflective array board 3a has a first side and a second side opposite to each other in the third direction. A first protective layer (not shown) is disposed on the first side of the reflective array board 3a, and/or a second protective layer (not shown) is provided on the second side of the reflective array board 3a.

In an embodiment of the present disclosure, by providing the protective layers on both sides of the reflective array board 3a, respectively, the reflective array board 3a can be protected and effectively prevented from being deformed. Especially, in the case where the reflective array board 3a is made of a metal material, water, gas such as oxygen, and the like can be effectively isolated from the reflective array board 3a by providing the protective layers, thereby effectively preventing the reflective array board 3a from being corroded, which is beneficial to prolonging a service life of a product.

Alternatively, the floating imaging assembly 3 according to an embodiment of the present disclosure may adopt another structure, as long as the another structure of the floating imaging assembly 3 can present a floating image based on the received light. Such a structure of the floating imaging assembly 3 may be applicable to the technical solution of the present disclosure.

Figure 9:
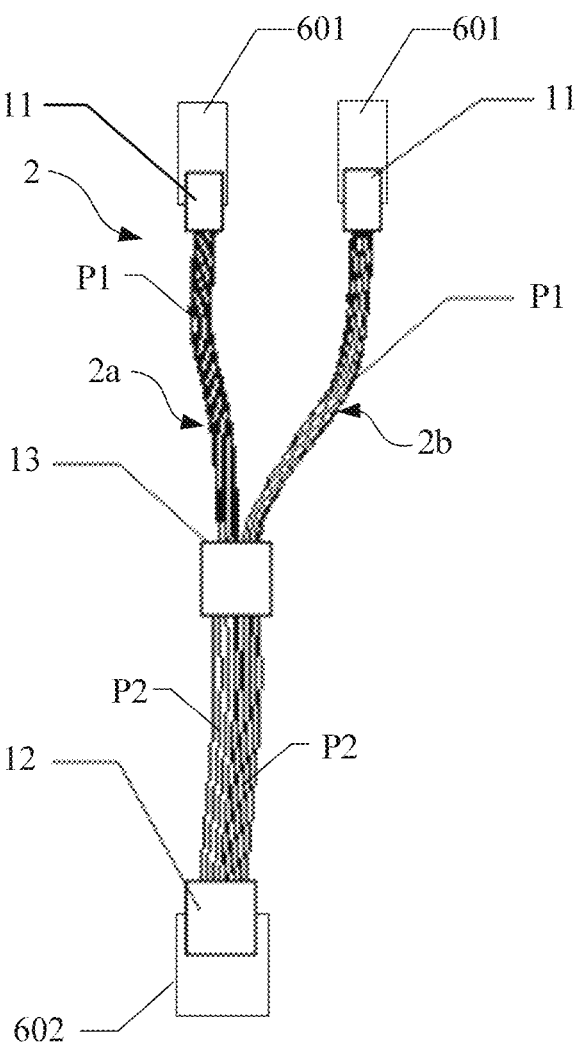
FIG. 9 is a schematic diagram of an image guide assembly according to an embodiment of the present disclosure.

FIG. 9 is a schematic diagram showing a structure of an image guide assembly according to an embodiment of the present disclosure. As shown in FIG. 9, in some embodiments, the image guide assembly 2 includes at least one optical fiber image transmitting bundles 2a and 2b, and an eyepiece assembly 602 and an objective lens assembly 601 are respectively disposed at both ends of each of the optical fiber image transmitting bundles 2a and 2b. A light incident surface of each objective lens assembly 601 serves as the light inlet of the image guide assembly 2, and a light outgoing surface of each objective lens assembly 601 serves as the light outlet of the image guide assembly 2.

Generally, each of the optical fiber image transmitting bundles 2a and 2b includes a plurality of optical fiber filaments, and sleeves 11 and 12 are respectively disposed at both ends of each of the optical fiber image transmitting bundles 2a and 2b. The sleeves 11 and 12 at both ends of each optical fiber image transmitting bundle can respectively fix both ends of all the optical fiber filaments in the optical fiber image transmitting bundle together. The sleeves 11 and 12 arranged at both ends of each of the optical fiber image transmitting bundles 2a and 2b are compatible with the objective lens assembly 601 and the eyepiece assembly 602, respectively, so as to realize the assembling and fixation of each of the optical fiber image transmitting bundles 2a and 2b with the objective lens assembly 601 and the eyepiece assembly 602, which will be described in detail later in connection with specific examples.

Each of the optical fiber filaments includes a core layer and a cladding layer, and a refractive index of the core layer is greater than a refractive index of the cladding layer. In some embodiments, a material of the core layer is high purity silicon dioxide, and a material of the cladding layer is silicon dioxide doped with diboron trioxide.

As an example, an end surface of all the plurality of optical fiber filaments in each optical fiber image transmitting bundle proximal to (and opposite to) the first lens assembly has a shape of a square and a size of about 3 mm×3 mm. Each optical fiber filament has a diameter of about 15 µm and a length of about 270 mm. The number of the optical fiber filaments OF included in each optical fiber image transmitting bundle is about forty thousand. Each of the sleeves 11 and 12 provided on each optical fiber image transmitting bundle may have a circular cross-section.

In an embodiment of the present disclosure, considering that the floating image of the light emitting object presented by the reflective array board 3a is mirror-symmetrical with the light emitting object itself by adopting the reflective array board 3a as the floating imaging assembly 3 (i.e. the floating image of the light emitting object is rotated by 180 degrees relative to the light emitting object itself), to ensure that the floating image, which is presented by the reflective array board 3a, of a rear view image received by the light inlet is identical to the rear view image, the inside of each of the optical fiber image transmitting bundles 2a and 2b needs to be twisted by 180 degrees in total, i.e., an arrangement of the optical fiber filaments at one end of each optical fiber image transmitting bundle 2a or 2b is twisted by 180 degrees relative to an arrangement of the optical fiber filaments at the other end of each optical fiber image transmitting bundle 2a or 2b.

It should be noted that a shape of an outer contour of the overall pattern formed by all the optical fiber filaments included in each optical fiber image transmitting bundle 2a or 2b at each end of the optical fiber image transmitting bundle 2a or 2b may be a regular shape such as a circle, an ellipse, a rectangle, a hexagon, or may be an irregular shape.

Generally, a viewing angle corresponding to one optical fiber image transmitting bundle is limited, and thus may not meet the requirement of a user on a large rear viewing angle. In some embodiments, the number of optical fiber image transmitting bundles is 2 or more (e.g., two optical fiber image transmitting bundles 2a and 2b are exemplarily shown in FIG. 9). By providing two or more optical fiber image transmitting bundles, the rear viewing angle can be effectively increased.

In a practical application, if two or more independent optical fiber image transmitting bundles are arranged in the wearable device, a larger space will be occupied, and especially if each optical fiber image transmitting bundle 2a or 2b is configured with an independent objective lens assembly 601 and an independent eyepiece assembly 602, the occupied space is larger, such that a wearing space in the wearable device for the user to wear the wearable device is reduced.

In view of the above technical problem, the present disclosure provides corresponding solutions. In some embodiments, the optical fiber image transmitting bundles 2a and 2b are in one-to-one correspondence with the objective lens assemblies 601, and all optical fiber image transmitting bundles 2a and 2b share a same eyepiece assembly 602. In the present embodiment, a same eyepiece assembly 602 is shared by all the optical fiber image transmitting bundles 2a and 2b, such that the number of eyepiece assemblies 602 can be effectively reduced, thereby reducing the space occupied by the image guide assembly 2 to a certain extent. In addition, the objective lens assemblies 601 of the optical fiber image transmitting bundles 2a and 2b are independent of each other, thereby ensuring that a light incident angle of each optical fiber image transmitting bundle is flexibly adjustable.

In some embodiments, the image guide assembly 2 further includes an integrating fixture 13. One end of each optical fiber image transmitting bundle 2a or 2b is connected to a corresponding objective lens assembly 601, and the other end of each optical fiber image transmitting bundle 2a or 2b is connected to the eyepiece assembly 602 through the integrating fixture 13.

In some embodiments, a portion of each optical fiber image transmitting bundle 2a or 2b located between the corresponding objective lens assembly 601 and the integrating fixture 13 is a first part P1, and a portion of each optical fiber image transmitting bundle 2a or 2b located between the integrating fixture 13 and the eyepiece assembly 602 is a second part P2. The arrangements of the optical fiber filaments at both ends of the first part P1 are twisted by 180 degrees relative to each other (i.e., an arrangement of the optical fiber filaments at one end of a first part P1 is twisted by 180 degrees relative to an arrangement of the optical fiber filaments at the other end of the first part P1), whereas the arrangements of the optical fiber filaments at both ends of the second part P2 are identical to each other. That is, the first part P1 of each optical fiber image transmitting bundle is twisted, whereas the second part P2 of each optical fiber image transmitting bundle is not twisted.

In some embodiments, peripheries of the first parts P1 of the optical fiber image transmitting bundles 2a and 2b are provided with first protective hoses (not shown) in one-to-one correspondence with the first parts P1 of the optical fiber image transmitting bundles 2a and 2b. Peripheries of the second parts P2 of the optical fiber image transmitting bundles 2a and 2b are provided with a second protective hose (not shown), and the second parts P2 of all the optical fiber image transmitting bundles 2a and 2b correspond to a same second protective hose.

The periphery of the first part P1 of each optical fiber image transmitting bundle 2a or 2b is provided with an independent first protective hose, which can facilitate the flexible adjustment of the light incident angle of the optical fiber image transmitting bundle 2a or 2b. The second parts P2 of all the optical fiber image transmitting bundles 2a and 2b are wrapped in the same second protective hose, such that an amount of the material of the protective hoses used can be effectively reduced, thereby further reducing the space occupied by the image guide assembly 2 to a certain extent.

In some embodiments, each of the protective hoses described above is a metal hose. In some embodiments, a material of the metal hose includes aluminum.

In some embodiments, a shape of an outer contour of a surface, which is proximal to the eyepiece assembly 602, of the reflective array board 3a matches a shape of an outer contour of the overall pattern formed by all the optical fiber filaments arranged directly opposite to the eyepiece assembly 602.

Figure 10A:
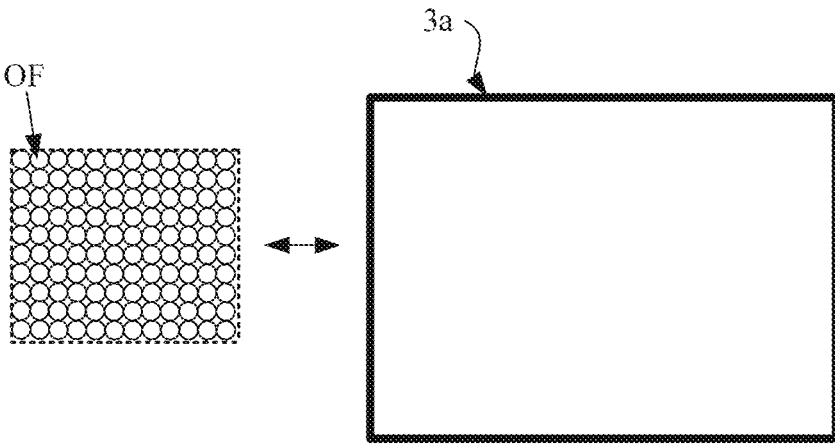
FIGS. 10A to 10C are three schematic diagrams each showing an outer contour shape of an overall pattern formed by an arrangement of all optical fiber filaments directly opposite to (or facing) an eyepiece assembly and an outer contour shape of a reflective array board corresponding to the outer contour shape of the overall pattern, according to an embodiment of the present disclosure.
Figures 10B, 10C:
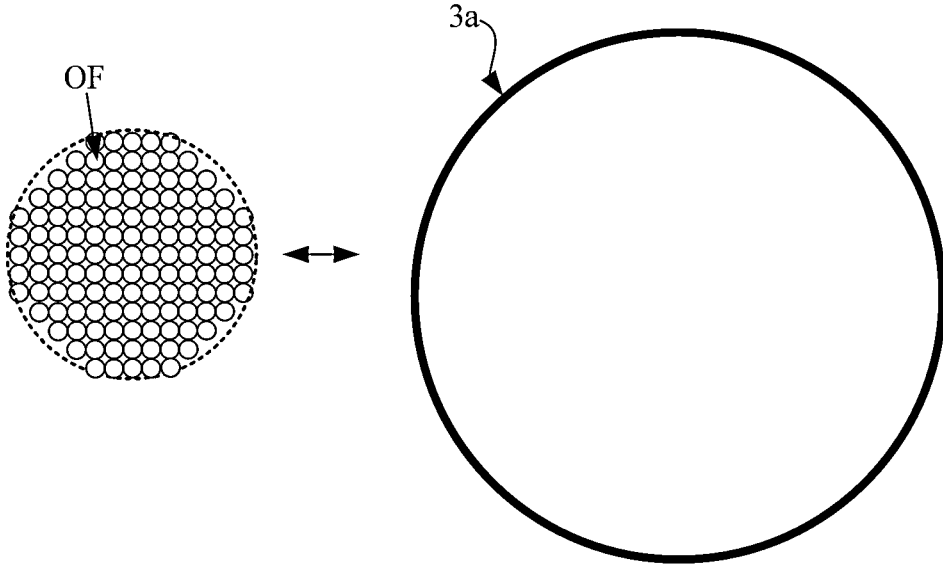

FIG. 10A to 10C are three schematic diagrams each showing an outer contour shape (i.e., a shape of an outer contour) of the overall pattern formed by an arrangement of all the optical fiber filaments directly opposite to (or facing) the eyepiece assembly and an outer contour shape of the reflective array board 3a corresponding to the outer contour shape of the overall pattern, according to an embodiment of the present disclosure. As shown in FIGS. 10A to 10C, in an embodiment of the present disclosure, an outer contour shape of a surface of the reflective array board 3a proximal to the eyepiece assembly 602 is generally one of a rectangle, a circle, and an ellipse. The outer contour shape of the reflective array board 3a may be designed according to the outer contour shape of the overall pattern formed by the arrangement of all the optical fiber filaments OF directly opposite to the eyepiece assembly 602.

As shown in FIG. 10A, as an example, the outer contour shape of the overall pattern formed by the arrangement of all the optical fiber filaments OF directly opposite to the eyepiece assembly 602 is a rectangle, and the outer contour shape of the surface of the reflective array board 3a proximal to the eyepiece assembly 602 may be designed as a rectangle.

Referring to FIGS. 10B and 10C, as another two examples, the outer contour shape of the overall pattern formed by the arrangement of all the optical fiber filaments OF directly opposite to the eyepiece assembly 602 is a circle, and the outer contour shape of the surface of the reflective array board 3a proximal to the eyepiece assembly 602 may be designed as a circle (as shown in FIG. 10B) or an ellipse (as shown in FIG. 10C).

It should be noted that in the cases shown in FIGS. 10A and 10B, the outer contour shape of the surface of the reflective array board 3a proximal to the eyepiece assembly 602 is the same as the outer contour shape of the overall pattern formed by the arrangement of all the optical fiber filaments OF directly opposite to the eyepiece assembly 602, but these two contours have different sizes, respectively. A size of an outer contour of the surface of the reflective array board 3a proximal to the eyepiece assembly 602 is greater than a size of an outer contour of the overall pattern formed by the arrangement of all the optical fiber filaments OF directly opposite to the eyepiece assembly 602. By such a design, the reflective array board can be utilized to the maximum, which is beneficial to reducing a size of the reflective array board, and reducing a mass of and a space occupied by the reflective array board.

Figure 11:
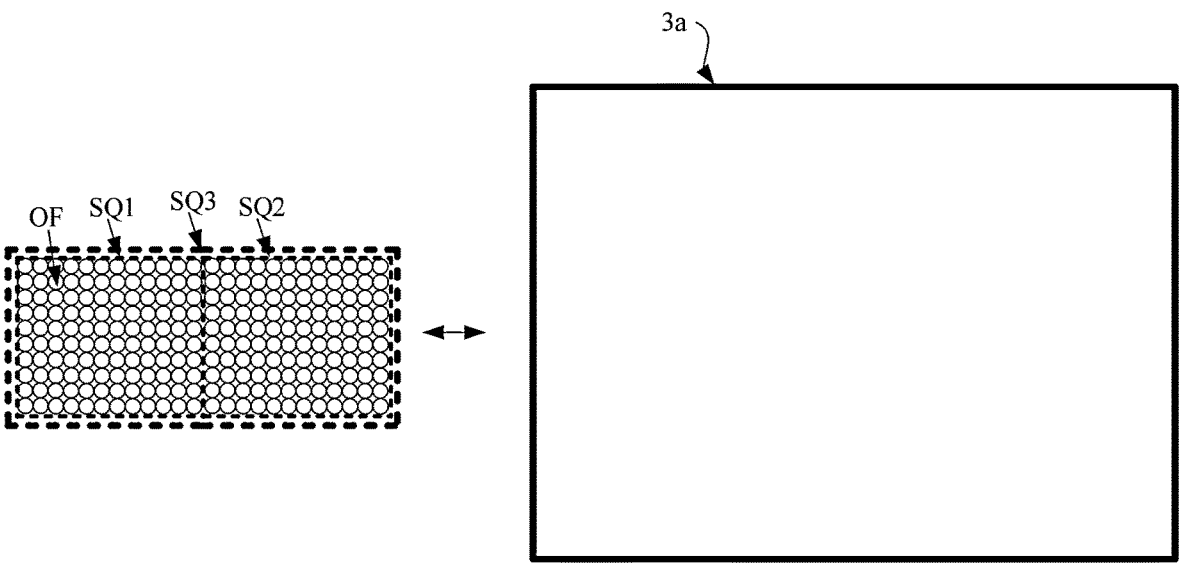
FIG. 11 is another schematic diagram showing an outer contour shape of an overall pattern formed by an arrangement of all optical fiber filaments directly opposite to (or facing) an eyepiece assembly and an outer contour shape of a reflective array board corresponding to the outer contour shape of the overall pattern, according to an embodiment of the present disclosure.

FIG. 11 is another schematic diagram showing an outer contour shape of an overall pattern formed by an arrangement of all optical fiber filaments directly opposite to (or facing) an eyepiece assembly and an outer contour shape of a reflective array board corresponding to the outer contour shape of the overall pattern, according to an embodiment of the present disclosure. As shown in FIG. 11, in some embodiments, there are provided two optical fiber image transmitting bundles, which are a first optical fiber image transmitting bundle 2a and a second optical fiber image transmitting bundle 2b, respectively. An outer contour shape of the overall pattern formed by all the optical fiber filaments OF in the first optical fiber image transmitting bundle 2a at the end of the first optical fiber image transmitting bundle 2a proximal to the eyepiece assembly 602 is a first rectangle SQ1 (further, an outer contour shape of the overall pattern formed by all the optical fiber filaments OF in the first optical fiber image transmitting bundle 2a at the end of the first optical fiber image transmitting bundle 2a proximal to the objective lens assembly 601 is a rectangle). An outer contour shape of the overall pattern formed by all the optical fiber filaments OF in the second optical fiber image transmitting bundle 2b at the end of the second optical fiber image transmitting bundle 2b proximal to the eyepiece assembly 602 is a second rectangle SQ2 (further, an outer contour shape of the overall pattern formed by all the optical fiber filaments OF in the second optical fiber image transmitting bundle 2b at the end of the second optical fiber image transmitting bundle 2b proximal to the objective lens assembly 601 is a rectangle). An outer contour shape of the overall pattern formed by all the optical fiber filaments OF in the first and second optical fiber image transmitting bundles 2a and 2b at the ends of the first and second optical fiber image transmitting bundles 2a and 2b proximal to the eyepiece assembly 602 is a third rectangle SQ3 formed by splicing the first rectangle SQ1 and the second rectangle SQ2 together. An outer contour shape of the surface of the reflective array board 3a proximal to the eyepiece assembly 602 is a fourth rectangle.

Figure 12:
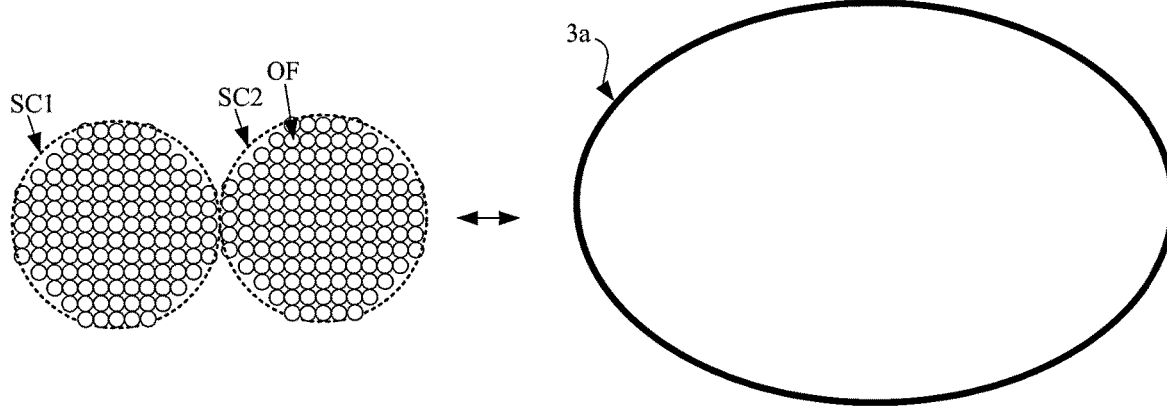
FIG. 12 is still another schematic diagram showing an outer contour shape of an overall pattern formed by an arrangement of all optical fiber filaments opposite to (or facing) an eyepiece assembly and an outer contour shape of a reflective array board corresponding to the outer contour shape of the overall pattern, according to an embodiment of the present disclosure.

FIG. 12 is still another schematic diagram showing an outer contour shape of an overall pattern formed by an arrangement of all optical fiber filaments OF directly opposite to (or facing) the eyepiece assembly 602 and an outer contour shape of the reflective array board 3a corresponding to the outer contour shape of the overall pattern, according to an embodiment of the present disclosure. As shown in FIG. 12, in some embodiments, there are provided two optical fiber image transmitting bundles, which are a first optical fiber image transmitting bundle 2a and a second optical fiber image transmitting bundle 2b, respectively. An outer contour shape of the overall pattern formed by all the optical fiber filaments OF in the first optical fiber image transmitting bundle 2a at the end of the first optical fiber image transmitting bundle 2a proximal to the eyepiece assembly 602 is a first circle SC1 (further, an outer contour shape of the overall pattern formed by all the optical fiber filaments OF in the first optical fiber image transmitting bundle 2a at the end of the first optical fiber image transmitting bundle 2a proximal to the objective lens assembly 601 is a circle). An outer contour shape of the overall pattern formed by all the optical fiber filaments OF in the second optical fiber image transmitting bundle 2b at the end of the second optical fiber image transmitting bundle 2b proximal to the eyepiece assembly 602 is a second circle SC2 (further, an outer contour shape of the overall pattern formed by all the optical fiber filaments OF in the second optical fiber image transmitting bundle 2b at the end of the second optical fiber image transmitting bundle 2b proximal to the objective lens assembly 601 is a circle). An outer contour shape of the overall pattern formed by all the optical fiber filaments OF in the first and second optical fiber image transmitting bundles 2a and 2b at the ends of the first and second optical fiber image transmitting bundles 2a and 2b proximal to the eyepiece assembly 602 is a bicircular shape (i.e., double-circle shape). An outer contour shape of the surface of the reflective array board 3a proximal to the eyepiece assembly 602 is a circle (not shown) or an ellipse (as shown in FIG. 12).

Figure 13:
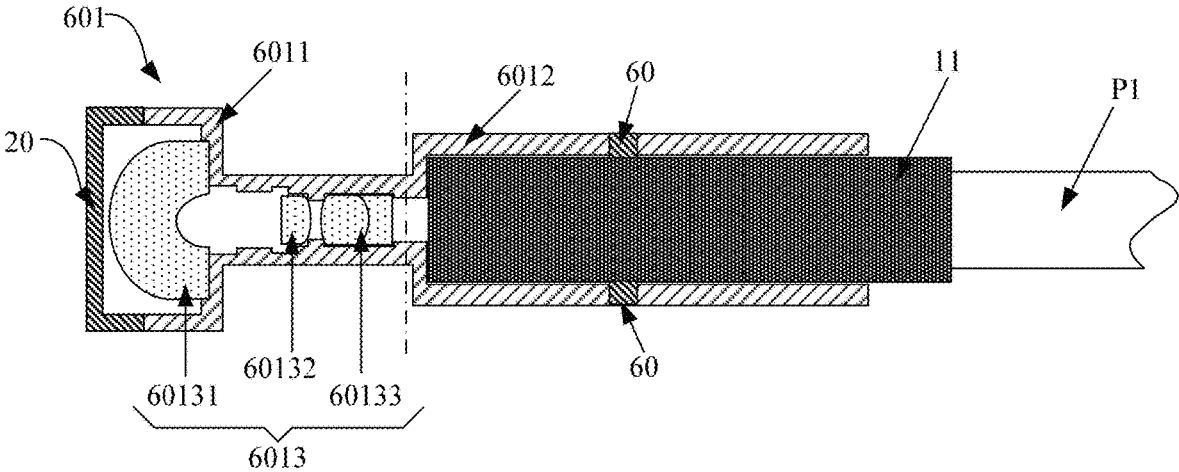
FIG. 13 is a schematic cross-sectional view of an objective lens assembly according to an embodiment of the present disclosure.

FIG. 13 is a schematic cross-sectional view of an objective lens assembly according to an embodiment of the present disclosure. As shown in FIG. 13, in some embodiments, each objective lens assembly 601 includes a first barrel (e.g., a first lens barrel), which includes a first subsection 6011 and a second subsection 6012 connected together. The first subsection 6011 has therein a first hollow structure, and the second subsection 6012 has therein a second hollow structure. A first lens assembly 6013 is disposed in the first hollow structure, and the second hollow structure is configured to fix a corresponding optical fiber image transmitting bundle.

The sleeve 11 disposed at an end of each optical fiber image transmitting bundle proximal to a corresponding objective lens assembly 601 may be inserted into a corresponding second hollow structure. The second hollow structure is provided with one or more screw holes (e.g., two screw holes are schematically shown in FIG. 13), and the sleeve 11 located in the second hollow structure may be fixed by rotating a screw 60 (e.g., a headless screw) into a screw hole such that an end of the screw 60 is in contact with the sleeve 11. An end surface of each of the plurality of optical fiber filaments OF in the sleeve 11 is disposed opposite to the first lens assembly 6013 located in the first hollow structure.

Figure 14:
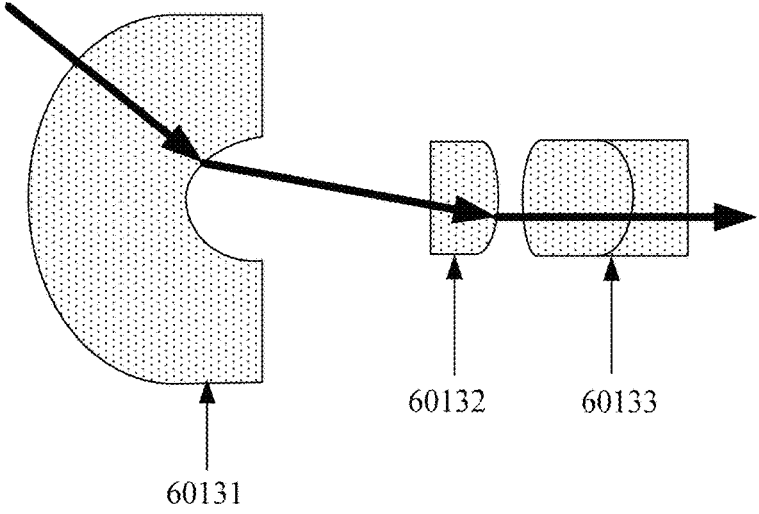
FIG. 14 is a schematic diagram showing a structure of a first lens assembly according to an embodiment of the present disclosure.

FIG. 14 is a schematic diagram showing a structure of the first lens assembly according to an embodiment of the present disclosure. As shown in FIGS. 13 and 14, in some embodiments, the first lens assembly 6013 includes a light collecting lens 60131, a first light collimating lens 60132, and a first glued double-lens 60133, which are sequentially disposed in a direction toward the second hollow structure.

The light collecting lens 60131 is configured to receive external light. The first light collimating lens 60132 is configured to collimate light. The first glued double-lens 60133 is a double-lens structure formed by two lenses with different refractive indexes and dispersions, and can effectively eliminate an image chromatic aberration.

In some embodiments, the light collecting lens 60131 may be a concavo-convex lens, of which a concave surface is proximal to the first light collimating lens 60132, a convex surface is distal to the first light collimating lens 60132, and an area of the convex surface is greater than an area of the concave surface. The light collecting lens 60131 has a large light collecting angle, and can effectively improve a rear viewing angle of each optical fiber image transmitting bundle.

In some embodiments, the first light collimating lens 60132 may be a plano-convex lens, of which a plane is proximal to the light collecting lens 60131, and a convex surface is proximal to the first glued double-lens 60133.

In some embodiments, the first glued double-lens 60133 may include a biconvex lens (i.e., a convexo-convex lens) and a plano-concave lens, and the plano-concave lens is located on a side of the biconvex lens distal to the first light collimating lens. A curvature of a convex surface of the biconvex lens proximal to the first light collimating lens is less than a curvature of a convex surface of the biconvex lens proximal to the plano-concave lens. A concave surface of the plano-concave lens matches to the convex surface of the biconvex lens proximal to the plano-concave lens.

Referring again to FIG. 13, in some embodiments, a light incident surface of the objective lens assembly 601 is provided thereon with a transparent protective cover 20. The transparent protective cover 20 provides effective protection for the objective lens assembly 601 while ensuring that ambient light can enter into the objective lens assembly 601. A material of the transparent protective cover may be a colored transparent plastic or a colored transparent rubber.

In some embodiments, the transparent protective covers of different objective lens assemblies 601 are of different colors. Therefore, overall colors of the rear view images actually received by different optical fiber image transmitting bundles will differ from each other significantly, such that a user can distinguish visual fields from each other.

Taking the cases shown in FIGS. 1A to 1C as an example, where the transparent protective cover of an objective lens assembly 601a is of blue, whereas the transparent protective cover of an objective lens assembly 601b is of green. As such, for two floating images finally observed by a user, a rear view image with the overall color of blue is the rear view image acquired by the objective lens assembly 601a, and a rear view image with the overall color of green is the rear view image acquired by the objective lens assembly 601b.

Figure 15:
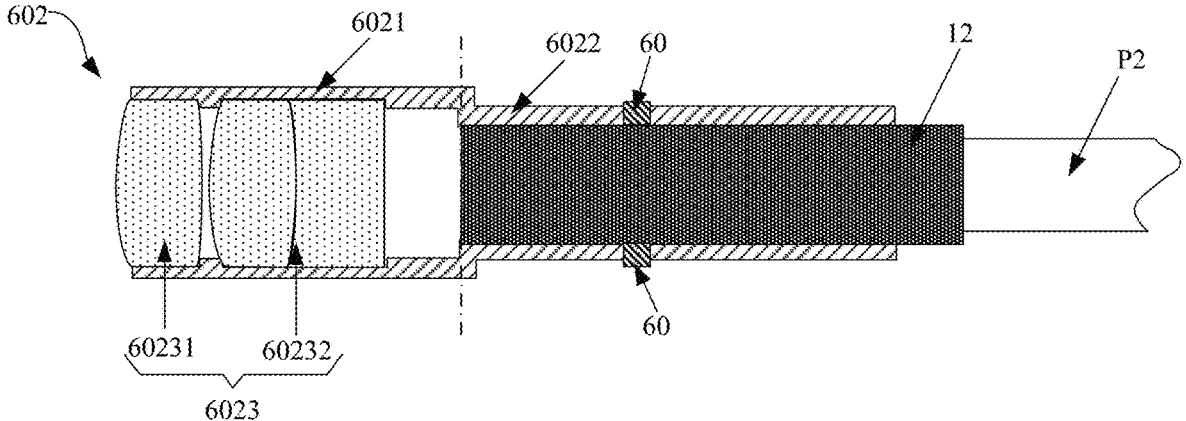
FIG. 15 is a schematic cross-sectional view of an eyepiece assembly according to an embodiment of the present disclosure.

FIG. 15 is a schematic cross-sectional view of an eyepiece assembly according to an embodiment of the present disclosure. As shown in FIG. 15, in some embodiments, the eyepiece assembly 602 includes a second barrel (e.g., a second lens barrel), which includes a third subsection 6021 and a fourth subsection 6022 connected together. The third subsection 6021 has a third hollow structure formed therein, and the fourth subsection 6022 has a fourth hollow structure formed therein. A second lens assembly 6023 is disposed in the third hollow structure, and the fourth hollow structure is configured to fix a corresponding optical fiber image transmitting bundle.

The sleeve 12 disposed at an end of each optical fiber image transmitting bundle proximal to a corresponding eyepiece assembly 602 may be inserted into a corresponding fourth hollow structure. The fourth hollow structure is provided with one or more screw holes (e.g., two screw holes are schematically shown in FIG. 15) through each of which a screw 60 (e.g., a headless screw) may be rotated such that an end of the screw 60 is in contact with the sleeve 12 located in the fourth hollow structure, thereby fixing the sleeve 12. An end surface of each of the plurality of optical fiber filaments OF in the sleeve 12 is disposed opposite to the second lens assembly 6023 located in the third hollow structure.

It should be noted that in the case where two or more optical fiber image transmitting bundles are provided and all of the optical fiber image transmitting bundles share a same eyepiece assembly 602, the ends of all the optical fiber filaments included in all of the optical fiber image transmitting bundles proximal to the eyepiece assembly 602 may be fixed by using a same sleeve 12.

Figure 16:
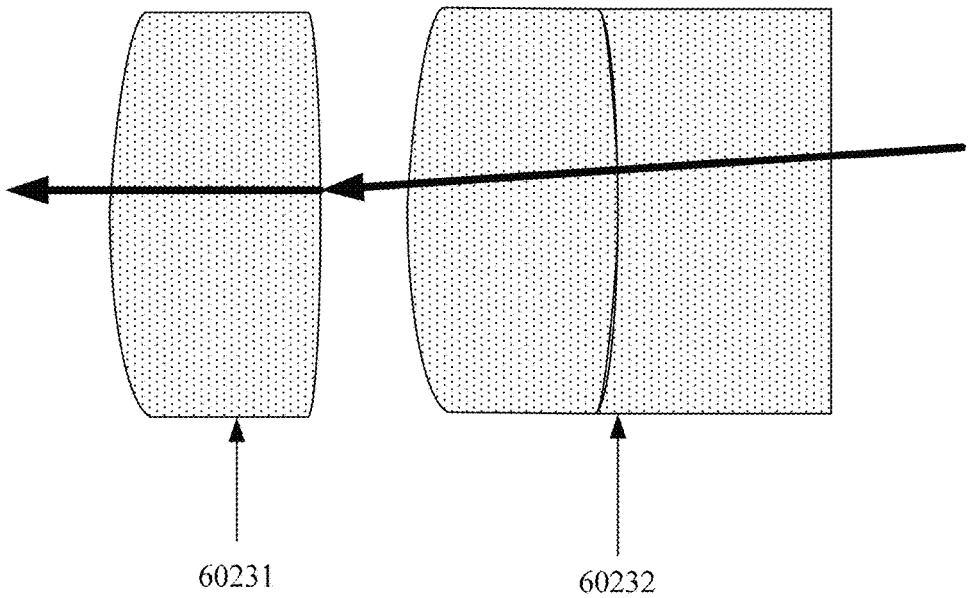
FIG. 16 is a schematic diagram showing a structure of a second lens assembly according to an embodiment of the present disclosure.

FIG. 16 is a schematic diagram showing a structure of the second lens assembly according to an embodiment of the present disclosure. As shown in FIGS. 15 and 16, in some embodiments, the second lens assembly 6023 includes a second light collimating lens 60231 and a second glued double-lens 60232 which are arranged in sequence in a direction toward the fourth hollow structure.

In some embodiments, the second light collimating lens 60231 may be a biconvex lens, where a curvature of a convex surface of the biconvex lens proximal to the second glued double-lens 60232 is less than a curvature of a convex surface of the biconvex lens distal to the second glued double-lens 60232.

In some embodiments, the second glued double-lens 60232 may include a biconvex lens and a plano-concave lens, and the plano-concave lens is located on a side of this biconvex lens distal to the second light collimating lens. A curvature of a convex surface of this biconvex lens proximal to the second light collimating lens 60231 is less than a curvature of a curved surface of the biconvex lens proximal to the plano-concave lens. A concave surface of the plano-concave lens matches to the convex surface of the biconvex lens proximal to the plano-concave lens.

It should be noted that the specific structures of the first lens assembly adopted in each objective lens assembly 601 and the second lens assembly adopted in the eyepiece assembly 602 illustrated in the above embodiments are only optional implementations according to embodiments of the present disclosure, and the present disclosure is not limited thereto.

With continuing reference to FIG. 1A, in some embodiments, the wearable main body 1 is provided therein with openings 8 at positions corresponding to the light inlets to ensure the incidence of the rear view light.

In some embodiments, the wearable device further includes a light shielding cover 9 matches to (or is fitted to) each opening 8, and the light shielding cover 9 is configured to be capable of being placed in a corresponding opening 8 to shield light emitted toward the corresponding opening 8. When a user does not need a rear view, the light shielding cover 9 may be placed in the corresponding opening 8 to shield (i.e., block) the light from entering a corresponding light inlet of the image guide assembly 2. When the user needs to a rear view, the light shielding cover 9 may be taken out from the corresponding opening 8, so as to ensure that the rear view light can be incident to the corresponding light inlet of the image guide assembly 2.

In some embodiments, the inner sidewall of each opening 8 is provided with an internal thread, and the outer sidewall of each light shielding cover 9 is provided with an external thread that matches to the internal thread of each opening 8. That is, the light shielding cover 9 according to an embodiment of the present disclosure and the corresponding opening 8 may be screwed onto each other.

In some embodiments, the wearable device further includes a position adjuster (i.e., a position adjusting member) 10. The floating imaging assembly 3 is connected to the wearable main body 1 through the position adjuster 10, and the position adjuster 10 is configured to adjust a position of the floating imaging assembly 3. The position adjuster 10 can adjust a position for placing the floating imaging assembly 3, to adjust an imaging position of the floating image, thereby meeting the requirements of different users.

In other embodiments, the floating imaging assembly 3 may be integrated into the eyepiece assembly 602. In particular, the floating imaging assembly 3 may be arranged in the second barrel and is positioned on a light outgoing side of the second lens assembly 6023.

It should be understood that the above embodiments are merely exemplary embodiments adopted to illustrate the principles of the present disclosure, and the present disclosure is not limited thereto. It will be apparent to one of ordinary skill in the art that various modifications and improvements may be made therein without departing from the spirit and essence of the present disclosure, and such modifications and improvements are also considered to be within the scope of the present disclosure.

What is claimed is:

1. A wearable device with a rear view function, the wearable device comprising:
    a wearable main body having a front view area and a rear view area;
    an image guide assembly fixed on the wearable main body and crossing over the front view area and the rear view area, wherein the image guide assembly has at least one light inlet and a light outlet, the at least one light inlet is in the rear view area, and the image guide assembly is configured to transmit rear view light received by the at least one light inlet to the light outlet and emit the rear view light; and a floating imaging assembly fixed on the wearable main body, and configured to form a floating image of a rear view image in the front view area according to light emitted from the light outlet;
    wherein the floating imaging assembly comprises a reflective array board, the reflective array board comprises a plurality of light reflective channels arranged in an array along a first direction and a second direction, the first direction intersects with the second direction, and an inner sidewall of each of the plurality of light reflective channels is configured to have a light reflectivity;
    wherein the reflective array board comprises a reflective layer having therein a plurality of light transmitting holes which arranged in the array along the first direction and the second direction, a sidewall of each of the plurality of light transmitting holes has the light reflectivity, and the plurality of light transmitting holes serve as the light reflective channels; and
    wherein each of the plurality of light transmitting holes is filled with a first transparent filler; and wherein the first transparent filler comprises at least one of silicon dioxide, polymethyl methacrylate, polystyrene, and polycarbonate.

2. The wearable device according to claim 1, wherein a cross-section of each of the plurality of light reflective channels in a plane parallel to a plane defined by the first direction and the second direction has a shape of a square or a rhombus;
    or
    wherein the reflective array board comprises two reflective layers stacked together, and the two reflective layers comprise a first reflective layer and a second reflective layer; the first reflective layer comprises a plurality of first reflective strips, which are arranged to be spaced apart from each other along the first direction, and extend along the second direction; the second reflective layer comprises a plurality of second reflective strips, which are arranged to be spaced apart from each other along the second direction, and extend along the first direction; and the first direction intersects with the second direction, the plurality of first reflective strips cross over the plurality of second reflective strips to define a plurality of light transmitting holes, a sidewall of each of the plurality of light transmitting holes has the light reflectivity, and the plurality of light transmitting holes serve as the light reflective channels;
    or
    wherein each of the plurality of light reflective channels has a thickness ranging from 0.5 mm to 1.5 mm in a third direction perpendicular to both the first direction and the second direction;
    or
    wherein the reflective array board has a first side and a second side opposite to each other in a third direction perpendicular to both the first direction and the second direction; and the first side of the reflective array board has a first protective layer thereon; and/or, the second side of the reflective array board has a second protective layer thereon.

3. The wearable device according to claim 1, wherein a material of the reflective layer is a metal material; and
    wherein the metal material comprises at least one of aluminum, silver, and chromium.

4. The wearable device according to claim 1, wherein the reflective array board comprises a first dielectric layer provided therein with a plurality of through holes which are arranged in the array along the first direction and the second direction, and a refractive index of a region surrounded by each of the plurality of through holes is less than a refractive index of the first dielectric layer; and the plurality of through holes serve as the plurality of light reflective channels.

5. The wearable device according to claim 1, wherein each of the plurality of light reflective channels has a hole diameter less than or equal to 0.8 mm; and wherein the hole diameter of each of the plurality of light reflective channels ranges from 0.4 mm to 0.6 mm.

6. The wearable device according to claim 1, wherein the image guide assembly comprises at least one optical fiber image transmitting bundle, and an eyepiece assembly and an objective lens assembly are respectively arranged at both ends of each of the at least one optical fiber image transmitting bundle; and a light incident surface of the objective lens assembly serve as one of the at least one light inlet of the image guide assembly, and a light outgoing surface of the objective lens assembly serve as the light outlet of the image guide assembly.

7. The wearable device according to claim 6, wherein each of the at least one optical fiber image transmitting bundle comprises a plurality of optical fiber filaments, and an arrangement of the plurality of optical fiber filaments at one end of each optical fiber image transmitting bundle is twisted by 180 degrees relative to an arrangement of the plurality of optical fiber filaments at the other end of the optical fiber image transmitting bundle;

or wherein the objective lens assembly comprises a first barrel having therein a first hollow structure and a second hollow structure connected to each other, the first hollow structure has a first lens assembly arranged therein, and the second hollow structure is configured to fix a corresponding optical fiber image transmitting bundle; and wherein the first lens assembly comprises a light collecting lens, a first light collimating lens, and a first glued double-lens which are arranged in sequence in a direction toward the second hollow structure;

or wherein the eyepiece assembly comprise a second barrel having therein a third hollow structure and a fourth hollow structure connected to each other, the third hollow structure has a second lens assembly therein, and the fourth hollow structure is configured to fix a corresponding optical fiber image transmitting bundle; and wherein the second lens assembly comprises a second light collimating lens and a second glued double-lens which are arranged in sequence in a direction toward the fourth hollow structure.

8. The wearable device according to claim 6, wherein the at least one optical fiber image transmitting bundle comprises two or more optical fiber image transmitting bundles.

9. The wearable device according to claim 8, wherein the optical fiber imaging bundles are in one-to-one correspondence with objective lens assemblies; and all of the optical fiber image transmitting bundles share a same eyepiece assembly.

10. The wearable device according to claim 9, wherein the image guide assembly further comprises an integrating fixture; and one end of each optical fiber image transmitting bundle is connected to a corresponding objective lens assembly, and the other end of each optical fiber image transmitting bundle passes through the integrating fixture and is connected to the eyepiece assembly.

11. The wearable device according to claim 10, wherein each optical fiber image transmitting bundle has a first part between the corresponding objective lens assembly and the integrating fixture and a second part between the integrating fixture and the eyepiece assembly; arrangements of the optical fiber filaments at both ends of the first part are twisted by 180 degrees relative to each other, and arrangements of the optical fiber filaments at both ends of the second part are identical to each other;

or wherein each optical fiber image transmitting bundle has a first part between the corresponding objective lens assembly and the integrating fixture and a second part between the integrating fixture and the eyepiece assembly; first protective hoses are provided on peripheries of first parts of the optical fiber image transmitting bundles and are in one-to-one correspondence with the first parts of the optical fiber image transmitting bundles; a second protective hose is provided on peripheries of second parts of the optical fiber image transmitting bundles, and the second parts of all of the optical fiber image transmitting bundles correspond to the second protective hose; wherein the first protective hoses are metal hoses, and/or, the second protective hose is a metal hose.

12. The wearable device according to claim 9, wherein an outer contour shape of a surface, which is proximal to the eyepiece assembly, of the reflective array board matches to an outer contour shape of an overall pattern formed by an arrangement of all the optical fiber filaments directly opposite to the eyepiece assembly.

13. The wearable device according to claim 12, wherein the outer contour shape of the surface, which is proximal to the eyepiece assembly, of the reflective array board comprises one of a rectangle, a circle, and an ellipse;

or wherein the outer contour shape of the overall pattern formed by the arrangement of all the optical fiber filaments directly opposite to the eyepiece assembly is a rectangle; the outer contour shape of the surface, which is proximal to the eyepiece assembly, of the reflective array board is a rectangle; wherein the optical fiber image transmitting bundles comprise two optical fiber image transmitting bundles, which are a first optical fiber image transmitting bundle and a second optical fiber image transmitting bundle, respectively; an outer contour shape of an overall pattern formed by an arrangement of all the optical fiber filaments in the first optical fiber image transmitting bundle at an end, which is proximal to the eyepiece assembly, of the first optical fiber image transmitting bundle is a first rectangle; an outer contour shape of an overall pattern formed by an arrangement of all the optical fiber filaments in the second optical fiber image transmitting bundle at an end, which is proximal to the eyepiece assembly, of the second optical fiber image transmitting bundle is a second rectangle; an outer contour shape of an overall pattern formed by an arrangement of all the optical fiber filaments in the first and second optical fiber image transmitting bundles at an end, which is proximal to the eyepiece assembly, of each of the first and second optical fiber image transmitting bundles is a third rectangle formed by splicing the first rectangle and the second rectangle together; and the outer contour shape of the surface, which is proximal to the eyepiece assembly, of the reflective array board is a fourth rectangle.

14. The wearable device according to claim 9, wherein the light incident surface of the objective lens assembly is provided thereon with a transparent protective cover; and wherein transparent protective covers of different objective lens assemblies are of different colors.

15. The wearable device according to claim 1, wherein the wearable main body is provided thereon with an opening at a position corresponding to each of the at least one light inlet;

wherein the wearable device further comprises a light shielding cover matching to the opening, wherein the light shielding cover is configured to be placed in the opening to shield light emitted toward the opening; and wherein an inner sidewall of the opening is provided with an internal thread, and an outer sidewall of the light shielding cover is provided with an external thread that matches to the internal thread of the opening.

16. The wearable device according to claim 1, further comprising a position adjuster, wherein the floating imaging assembly is connected to the wearable main body through the position adjuster, and the position adjuster is configured to adjust a position of the floating imaging assembly;

or wherein the wearable main body comprises a helmet or a goggle.

17. A wearable device with a rear view function, the wearable device comprising:

a wearable main body having a front view area and a rear view area;

an image guide assembly fixed on the wearable main body and crossing over the front view area and the rear view area, wherein the image guide assembly has at least one light inlet and a light outlet, the at least one light inlet is in the rear view area, and the image guide assembly is configured to transmit rear view light received by the at least one light inlet to the light outlet and emit the rear view light; and a floating imaging assembly fixed on the wearable main body, and configured to form a floating image of a rear view image in the front view area according to light emitted from the light outlet;

wherein the floating imaging assembly comprises a reflective array board, the reflective array board comprises a plurality of light reflective channels arranged in an array along a first direction and a second direction, the first direction intersects with the second direction, and an inner sidewall of each of the plurality of light reflective channels is configured to have a light reflectivity;

wherein the reflective array board comprises a first dielectric layer provided therein with a plurality of through holes which are arranged in the array along the first direction and the second direction, and a refractive index of a region surrounded by each of the plurality of through holes is less than a refractive index of the first dielectric layer; and the plurality of through holes serve as the plurality of light reflective channels;

wherein the refractive index of the first dielectric layer is greater than or equal to 1.5;

wherein a material of the first dielectric layer comprises at least one of silver sulfide, arsenic glass, titanium dioxide, and cadmium iodide; and wherein each of the plurality of through holes is filled with a second transparent filler, and the second transparent filler comprises at least one of silicon dioxide and a transparent resin.

18. The wearable device according to claim 17, wherein a cross-section of each of the plurality of light reflective channels in a plane parallel to a plane defined by the first direction and the second direction has a shape of a square or a rhombus;

or wherein the reflective array board comprises two reflective layers stacked together, and the two reflective layers comprise a first reflective layer and a second reflective layer; the first reflective layer comprises a plurality of first reflective strips, which are arranged to be spaced apart from each other along the first direction, and extend along the second direction; the second reflective layer comprises a plurality of second reflective strips, which are arranged to be spaced apart from each other along the second direction, and extend along the first direction; and the first direction intersects with the second direction, the plurality of first reflective strips cross over the plurality of second reflective strips to define a plurality of light transmitting holes, a sidewall of each of the plurality of light transmitting holes has the light reflectivity, and the plurality of light transmitting holes serve as the light reflective channels;

or wherein each of the plurality of light reflective channels has a thickness ranging from 0.5 mm to 1.5 mm in a third direction perpendicular to both the first direction and the second direction;

or wherein the reflective array board has a first side and a second side opposite to each other in a third direction perpendicular to both the first direction and the second direction; and the first side of the reflective array board has a first protective layer thereon; and/or, the second side of the reflective array board has a second protective layer thereon.

19. The wearable device according to claim 17, wherein the image guide assembly comprises at least one optical fiber image transmitting bundle, and an eyepiece assembly and an objective lens assembly are respectively arranged at both ends of each of the at least one optical fiber image transmitting bundle; and a light incident surface of the objective lens assembly serve as one of the at least one light inlet of the image guide assembly, and a light outgoing surface of the objective lens assembly serve as the light outlet of the image guide assembly.

20. The wearable device according to claim 19, wherein each of the at least one optical fiber image transmitting bundle comprises a plurality of optical fiber filaments, and an arrangement of the plurality of optical fiber filaments at one end of each optical fiber image transmitting bundle is twisted by 180 degrees relative to an arrangement of the plurality of optical fiber filaments at the other end of the optical fiber image transmitting bundle;

or wherein the objective lens assembly comprises a first barrel having therein a first hollow structure and a second hollow structure connected to each other, the first hollow structure has a first lens assembly arranged therein, and the second hollow structure is configured to fix a corresponding optical fiber image transmitting bundle; and wherein the first lens assembly comprises a light collecting lens, a first light collimating lens, and a first glued double-lens which are arranged in sequence in a direction toward the second hollow structure;

or wherein the eyepiece assembly comprise a second barrel having therein a third hollow structure and a fourth hollow structure connected to each other, the third hollow structure has a second lens assembly therein, and the fourth hollow structure is configured to fix a corresponding optical fiber image transmitting bundle; and wherein the second lens assembly comprises a second light collimating lens and a second glued double-lens which are arranged in sequence in a direction toward the fourth hollow structure.

\* \* \* \* \*